United States Patent
Pilu

(10) Patent No.: US 6,516,151 B2
(45) Date of Patent: Feb. 4, 2003

(54) CAMERA PROJECTED VIEWFINDER

(75) Inventor: Maurizio Pilu, Bristol (GB)

(73) Assignee: Hewlett-Packard Company, Fort Collins, CO (US)

( * ) Notice: Subject to any disclaimer, the term of this patent is extended or adjusted under 35 U.S.C. 154(b) by 81 days.

(21) Appl. No.: 09/780,368

(22) Filed: Feb. 12, 2001

(65) Prior Publication Data

US 2001/0019664 A1 Sep. 6, 2001

(30) Foreign Application Priority Data

Mar. 3, 2000 (GB) .............................................. 0005024

(51) Int. Cl.7 .......................... G03B 13/00; G03B 15/02
(52) U.S. Cl. .......................... 396/106; 396/431; 396/50
(58) Field of Search ................. 396/106, 431, 396/50

(56) References Cited

U.S. PATENT DOCUMENTS

| | | | |
|---|---|---|---|
| 3,848,996 A | 11/1974 | Goding | 355/43 |
| 4,244,649 A | 1/1981 | Rees et al. | 355/61 |
| 4,492,454 A | 1/1985 | Moser | 355/1 |
| 4,877,949 A | 10/1989 | Danielson et al. | 235/462 |
| 4,918,476 A | 4/1990 | Tejima | 354/221 |
| 5,059,019 A | 10/1991 | McCullough | 352/131 |
| 5,258,795 A * | 11/1993 | Lucas | 396/281 |
| 5,506,640 A | 4/1996 | Orlich | 353/28 |
| 5,694,632 A | 12/1997 | Capper | 396/431 |
| 5,752,115 A * | 5/1998 | McIntyre et al. | 396/108 |

FOREIGN PATENT DOCUMENTS

| | | | |
|---|---|---|---|
| EP | 0838751 A2 | 4/1998 | G06F/3/033 |
| EP | 0840200 A2 | 5/1998 | G06F/3/033 |
| EP | 1022608 A1 | 7/2000 | G03B/27/32 |
| GB | 2257800 A | 1/1993 | G03B/13/02 |
| JP | 57104918 | 6/1982 | G03B/13/02 |

* cited by examiner

Primary Examiner—Russell Adams
Assistant Examiner—D. Ben Esplin

(57) ABSTRACT

The present invention relates to a camera (1) that projects a pattern of visible light (28) onto an object such as a document (10) to be photographed to indicate to a photographer the area of the object within view of the camera. The camera comprising image capture means (18), a lens (2) arranged to image the document (10) in an object plane onto the image capture means (18), an image framing projector (2,20,22) operable to project visible optical radiation (24,26) onto the object plane to indicate to a user of the camera (1) the bounds (28) of the document (10) imaged onto the image capture means (18), and a camera attitude sensor system (9,15) for sensing the attitude of the camera (1). The image framing projector (2,20,22) is operable in response to the attitude sensor system (9,15) to project the optical radiation (24,26) onto the object plane only when the attitude sensor system (9,15) senses that the camera (1) is oriented so that the optical radiation (24,26) will be projected downwards.

15 Claims, 3 Drawing Sheets

CAMERA PROJECTED VIEWFINDER

The present invention relates to a camera that projects a pattern of visible light onto an object to be photographed to indicate to a photographer the area of the object within view of the camera.

TECHNICAL FIELD

In recent years, document scanners have become commonplace. Although these work well and are relatively inexpensive, a document scanner occupies a significant amount of scarce desk space.

BACKGROUND ART

The use of a camera to take a photograph of a document consisting of text and/or images offers one way of dealing with the problem of wasted desk space. In conventional film or electronic photography, a person may look through a viewfinder to aim the camera at an object. When the object is a document, for example a document lying on a desk, this means a person has to stand up, lean over the document, look through the viewfinder and then take the photograph. This is not very convenient. Furthermore, if the document is at the back of a desk, the person may have to move the document. In addition, the person's body may block ambient light, thereby requiring the use of a flash. The use of a flash in an office environment may be unacceptable.

Recently, some digital cameras have been provided with a liquid crystal display (LCD) viewfinder that may be viewed at some distance and that can be oriented by a user so that the LCD viewfinder may be viewed over a range of angles, for example at right angles to the optical axis of the camera. By pointing the lens downward while keeping the viewfinder at a convenient angle, it would then be possible to take a picture of a document on a desktop from a sitting position. Unfortunately, it is not intuitively obvious to most people which way a hand-held camera should be moved by looking at the LCD viewfinder.

SUMMARY

It is an object of the present invention to provide a camera that is more convenient to use when taking a photograph, for example a photograph of a document lying on a desk.

According to the invention, there is provided a camera comprising image capture means, a lens arranged to image an object in an object plane onto the image capture means, a light projector operable to project visible optical radiation onto the object plane to indicate to a user of the camera the field of view imaged onto the image capture means, and a camera attitude sensor system for sensing the attitude of the camera, wherein the image framing projector is operable in response to the attitude sensor system to project the optical radiation onto the object plane only when the attitude sensor system senses that the camera is oriented so that the optical radiation will be projected downwards.

The light projector may project just one area or pattern of light onto the object plane, for example a cross pattern centered in the camera field of view, or a box surrounding the field of view. Alternatively, more than one such area or pattern may be projected, for example four light beams which indicate the corners of the area in the object plane imaged by the camera.

Various light patterns, for example a cross, a framing box or four L-shaped framing indicators, may be formed in various ways. For example, the light source or sources may have corresponding shapes that are directed or focussed onto the image plane. Alternatively light from a point image source or sources can be shaped by passing the light through a transmissive optical diffractive element or reflecting the light off a reflective diffractive optical element.

In one embodiment of the invention, the light projector is an image framing projector operable to project visible optical radiation onto the object plane to indicate to a user of the camera the bounds of the object imaged onto the image capture means.

The camera can then be configured so that the optical radiation can projected either automatically or manually only when the optical radiation will be projected downwards.

Because the document will normally be below the level of the camera, for example lying on a desktop, the projected optical radiation can therefore be made available only when the camera is to be used to capture an image of such a document. This reduces the concern of such optical radiation being directed into a person's eyes, which makes the camera potentially safer, as well as less likely to annoy such persons.

The term "lens" as used herein is not restricted to a single lens element and includes lenses with compound optical elements.

The image capture means may be photographic film, or an electronic device, for example a detector array, in particular a two-dimensional CCD array or CMOS array.

The source of visible optical radiation is preferably a compact solid state device or devices, for example one or more light emitting diodes or laser diodes. There may be several such devices, for example, four devices each providing light projected onto one of the four corners of the object plane. Alternatively, one such device may be used with the light being split into discrete sources by a number of fibre optic light guides.

The attitude sensor system may comprise one or more tilt sensors or accelerometers, arranged to provide a signal indicative of the attitude of the camera.

So that the projected optical radiation is not projected when such radiation would be close to horizontal, it is preferred if the image framing projector is operable in response to the attitude sensor system to project the optical radiation onto the object plane only when the attitude sensor system senses that the camera is oriented so that the optical radiation will be projected downwards with a predetermined angle at least 30° below horizontal. Such as angle corresponds with that which may be appropriate when using a hand-held camera to image a document lying on a work surface such as a desktop. A further degree of safety can be achieved if the optical radiation is projected onto the object plane only when the attitude sensor system senses that the camera is oriented so that the optical radiation is projected downwards within 30° of vertical. This may be appropriate if the camera is mounted on a support nearly above a document to be imaged, such as a post attached to the side of a work surface or desktop.

Optionally, the camera may have means by which the angle at which the projected light becomes operable can be selected by a user of the camera.

In a preferred embodiment of the invention, the attitude sensor system senses the rate of change of the attitude of the camera, the image framing projector being operable in response to the attitude sensor system to project the optical radiation onto the object plane only when the attitude sensor system senses that the rate of change of camera attitude is below a predetermined threshold.

For the convenience of the user, the camera may have a timer that times a predetermined time delay in response to the camera attitude sensor when the camera has been oriented so that the optical radiation would be projected downwards. The optical radiation is then automatically projected downwards following the predetermined time delay.

It may be, however, that a person may wish to image a document that is not below the level of the camera. For example, if the document is posted on a notice board, then it may even be above the level of the camera. Therefore, the camera may have an override feature, such as a user-selectable switch, that disables the operation of the camera attitude sensor system.

Preferably, however, the camera has two or several automatically configurable modes of operation, for example in addition to a document-capture mode, the camera have a scene-capture mode, such as a still camera mode, or video camera mode. In this case, the camera is automatically configured in a document-capture mode when the attitude sensor system senses that the camera is oriented so that the optical radiation will be projected downwards. The camera may then be automatically configured in a different mode of operation when the attitude sensor system senses a different camera attitude in which the optical radiation would not be so projected downwards.

Since cameras generally have a useful depth of focus, the image need not lie exactly in focus. For example, when taking a picture from a seated position of a document lying on a desktop, the document will generally be at an angle to the exact object plane. However, as long as the document lies within the depth of focus of the camera, it may still be imaged accurately. Therefore, the term "object plane" as used herein is not limited to the exact object plane, but includes other object planes within the depth of focus of the camera.

A user may therefore use the camera, without the need to peer through any viewfinder, to point roughly in the direction of the object, for example a document lying on a desktop, and then move the camera until the projected visible optical radiation indicates the bounds of the camera's view, whereupon the picture may be taken.

If the camera is not hand-held, but mounted, for example on a bracket attached to a desktop or other item of office furniture, then the document may be moved until it falls within the bounds indicated by the projected optical radiation.

In one embodiment of the invention, at least two points, lines or areas of optical radiation are projected onto the object plane, for example at opposite corners of a rectangular field of view for the camera. Preferably, there is a pattern of projected optical radiation that indicates all four corners of a camera's field of view. Such a pattern may then bracket or delineate the bounds of the object to be imaged onto the image capture means.

In one embodiment of the invention, the source of optical radiation is projected onto the object plane independently of the lens. The source may therefore have optical elements to collimate or focus the optical radiation. If the source is a commercially available laser diode, then these elements may be included with the packaging of the laser diode device. The beams of optical radiation from the sources may then be angled to correspond with the periphery of the angle of view of the lens.

BRIEF DESCRIPTION OF THE DRAWINGS

In an alternative embodiment of the invention, the lens projects the optical radiation onto the object plane. The sources of optical radiation may therefore be provided within the protective confines of a camera body.

The camera may have a viewfinder and a mirror that reflects light between the lens and viewfinder. Optical radiation is then directed to the lens via a reflection from the mirror.

If the camera is of the single lens reflex type, then the mirror may be movable. This arrangement is particularly suitable in the case that the image capture means is photographic film, because then it is possible to design the camera to keep stray light from the sources from reaching and exposing the film. Alternatively, the mirror may be fixed and partially reflective and transmissive.

DETAILED DESCRIPTION

For applications such as imaging of a document on a desktop, it is preferable if the image capture means is an electronic detector array. In this case, the source of optical radiation may be provided within the camera in an image plane of the lens. Stray light from the sources may still, of course, affect such a detector array, in which case the sources or sources of optical radiation may be switched off just before the detector array, and any associated electronics, are activated to capture the image. Because the image capture time of such an array is quite fast, of the order to 50 ms or less, a momentary disappearance of the visible optical radiation may scarcely be noticed by the user of the camera. Therefore, no optical radiation may be projected when the image capture means captures an image.

In order to keep the pattern of projected optical radiation well defined across a range of camera operating distances, it is advantageous if the camera has means for focussing in conjunction both an image of the object on the image capture means and the optical radiation projected onto the object plane. In the case of a source of optical radiation inside the camera that passes through the lens, this may be done by focussing the lens or moving the image capture means and the optical source or sources to lie on an in-focus image plane. The optical radiation projected onto the object may therefore be kept in focus automatically as the camera focuses on the object.

Figure 1:
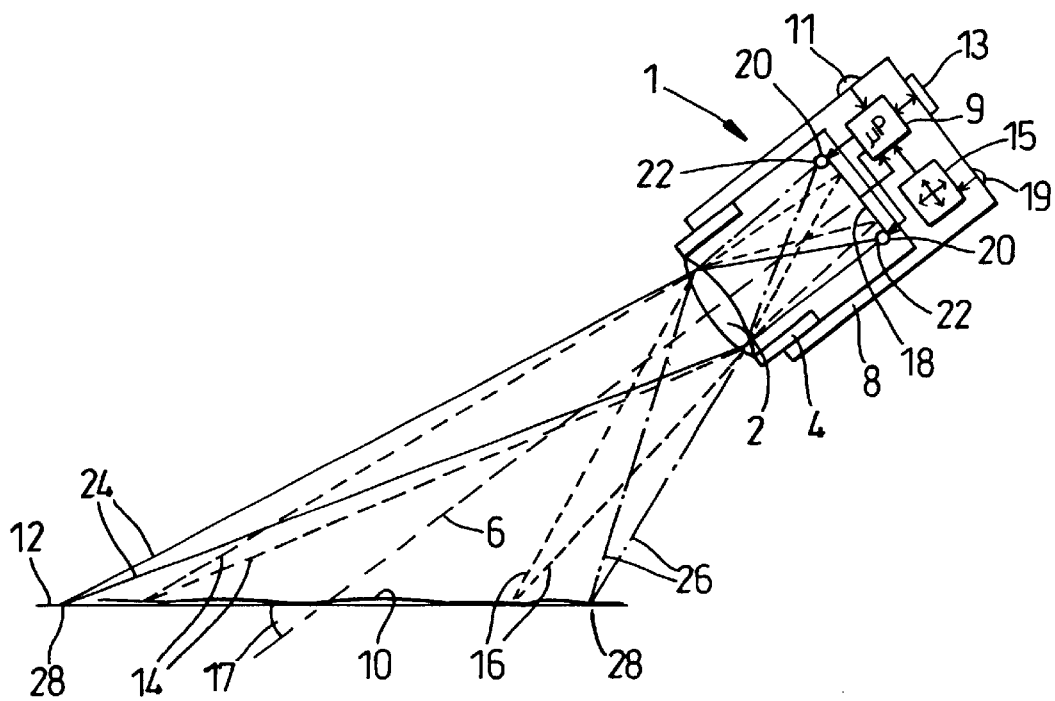
Figure 2:
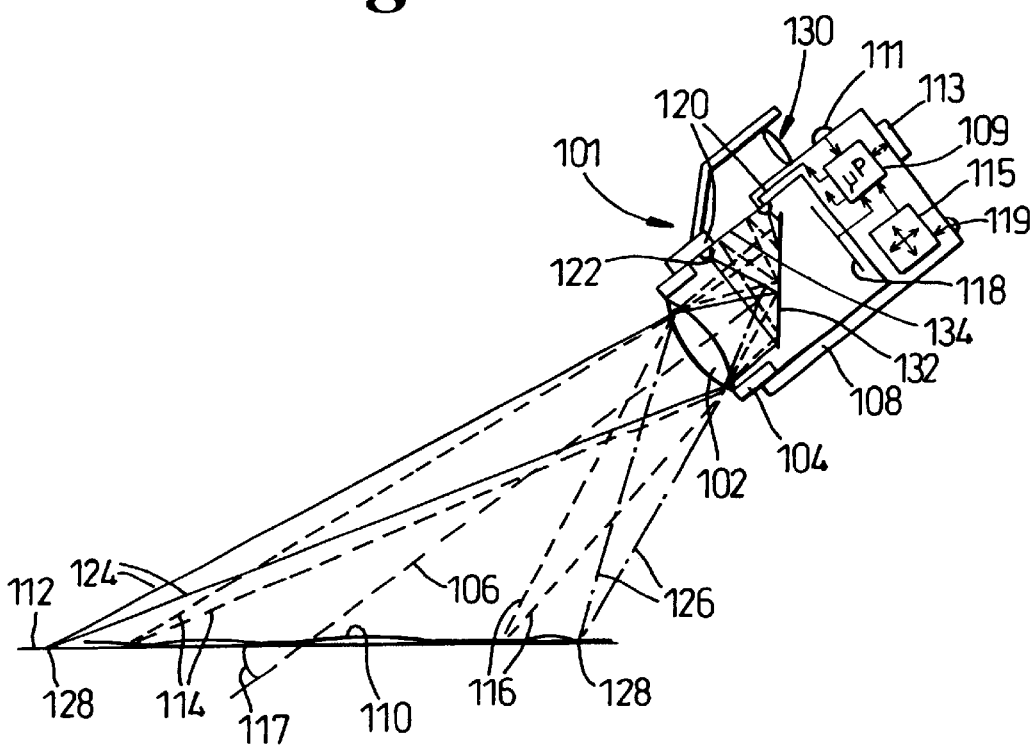
Figure 3:
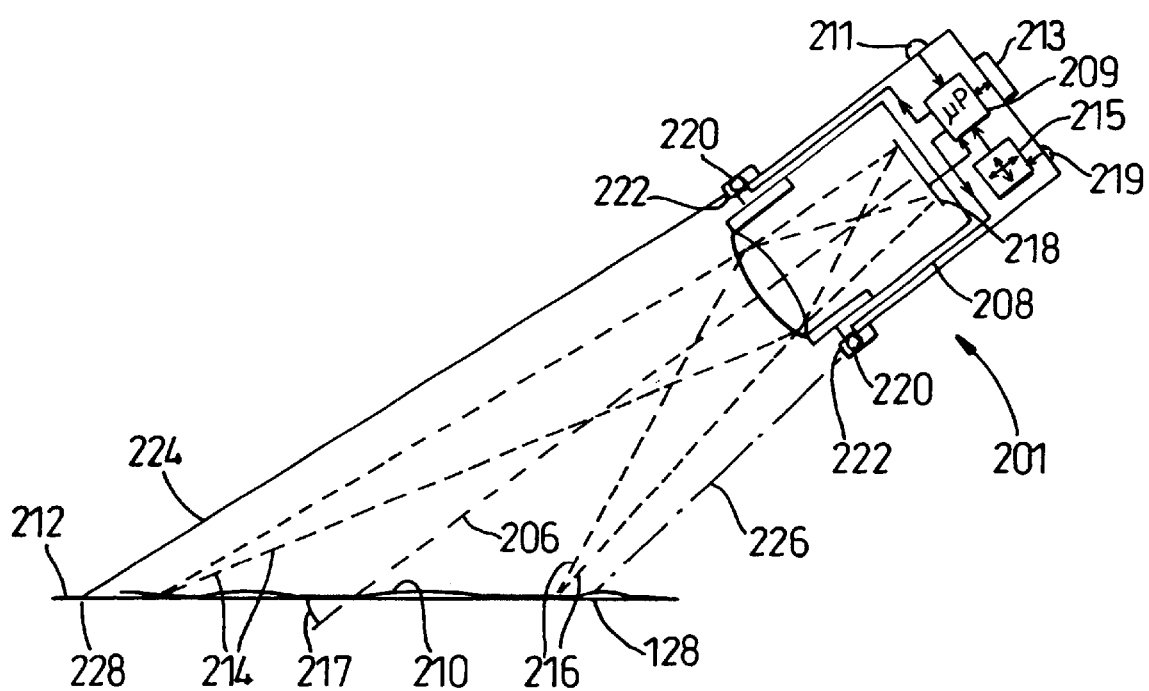
Figure 4:
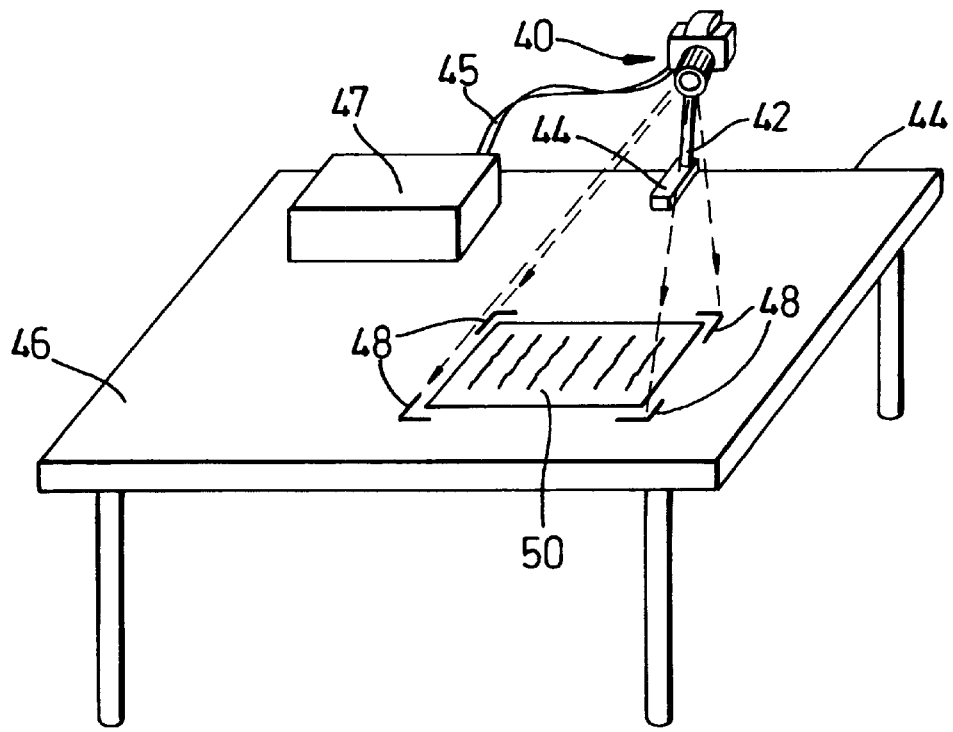
Figure 5:
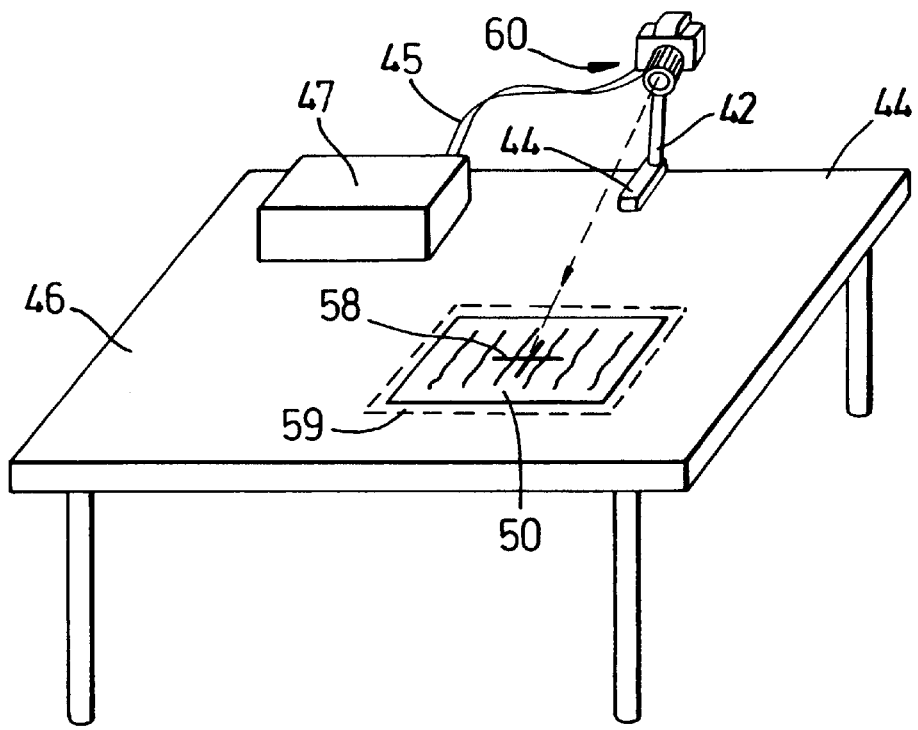

The invention will now be further described, by way of example, with reference to the accompanying drawings, in which:

FIG. 1 is a schematic drawing of a first embodiment of a camera according to the invention, with a camera attitude sensor system, and two or more sources of visible optical radiation near the edges of an electronic image detector array projected onto an object plane ia the camera's lens;

FIG. 2 is a schematic drawing of a second embodiment of a camera according to the invention, similar to that of FIG. 1 but with a reflex mirror that reflects light from the optical sources to the lens;

FIG. 3 is a schematic drawing of a third embodiment of a camera according to the invention, similar to that of FIG. 1 but with two or more sources of optical radiation provided externally to the camera and lens; and FIGS. 4 and 5 are perspective views of cameras according to the invention being used to image a document lying on a desktop.

Referring first to FIG. 1, a digital camera 1 has a compound lens 2 held in a lens body 4. The camera 1 may be focussed by sliding the lens body 4 along the optical axis 6 of the lens 2 with respect to a camera body 8. The camera operates under the control of a microprocessor ($\mu$P) 9 within the body 8, in one of two modes, either with a manually operable exposure press button 11 connected to the microprocessor 9, or remotely through an interface 13 also connected to the microprocessor 9. Not shown are other well-known components of digital cameras, such as an exposure diaphragm, battery, autofocus control detector, electronics and mechanism, flash unit, memory or removable data storage medium, etc.

The lens is directed downwards at an oblique angle towards a document 10 lying on a generally horizontal desktop 12. Rays 14,16 from opposite portions of the document 10 are captured by the lens 2 and brought to focus in an image plane defined by an image capture means in the form of a two dimensional CCD detector array 18 within the camera body 8. The detector array 18 may be any convenient shape but will generally be either square or rectangular.

Although parts of the document 10 lie at different distances from the lens 2, in this example all parts of the document lie within the depth of focus defined by the lens, exposure diaphragm setting, and the position of the detector array 18. The document 10 can therefore be said to lie in an object plane of the lens 2.

Four visible light emitting diodes (LEDs) 20, two of which may be seen in the drawing, are positioned within the camera body 8 at four points proximate but just outside the bounds of the detector array 18. The light from each LED 20 is not collimated, but is directed and concentrated by a lens element 22 associated with each LED generally towards the camera lens 2. Because the LEDs 20 lie in the image plane of the lens 2, the lens then focuses the light 24,26 from each LED 20 to four points 28 proximate but outside a square or rectangular field of view defined by the lens 2 and the CCD array 18. The arrangement is such that the lens 2 focuses in conjunction both an image of the document 10 on the image capture means 18 and the rays 24,26 projected onto the desktop 12. The rays 24,26 are therefore automatically kept in focus at the object plane 12 as the camera focuses an image of the object on the detector 18.

The camera 1 has inside the camera body 8 a tilt sensor 15 connected to the microprocessor 9, which together form an attitude sensor system. The tilt sensor senses the tilt of the camera body, and specifically a tilt angle 17 of the lens axis 6 with respect to a horizontal plane, which is represented in the drawing by the desktop 12. The tilt sensor 15 sends a continuously updated digital signal to the microprocessor 9, which is a measure of the detected tilt angle accurate to about ±1°. When the tilt sensor 15 senses that the tilt angle 17 is less than 30°, the microprocessor 9 inhibits the operation of the LEDs 20. When the sensed tilt angle 15 is at least 30°, the microprocessor 9 then permits operation of the LEDs 20 after a time delay of one second, as long as the sensed tilt angle remains at least 30°, and the sensed rate of change of tilt remains below about 90° per second.

Therefore, when the press button 11 is activated by a user of the camera 1 when the camera is oriented so that the visible light 24,26 will be projected steadily downwards, as shown in the drawing, the microprocessor 9 activates the LEDs to illuminate an image capture area on the document. This helps to prevent optical radiation 24,26 from the LEDs 20 directly reaching a person's eyes.

When the image is taken, the microprocessor 9 momentarily inhibits operation of the LEDs 20 so that any light from the LEDs 20 internally scattered or reflected within the camera 1 does not affect the image captured of the document 10.

A person may therefore pick up the camera 1, aim the camera obliquely downwards in the general direction towards the document 10 on the desktop, and then observe the locations of the points 28 that indicate corners of the camera's rectangular field of view. If the camera 1 is not pointed correctly, the person may then move the camera 1 and/or the document 10 until the points 28 bracket the document 10 so that all portions of interest of the document fall within the field of view. The user can then press the exposure button 11, or as shown in FIG. 4 use a suitable controller 47 connected via a communications cable 45 to the interface 13, to capture an image of the document 10.

When pointing the camera 1 downwards towards a document on the desk, the angle of the optical axis 6 to the plane of the desk 12 may become so shallow that not all portions of the document 10 remain in focus. Another difficulty is that keystone distortion or defocus of the document 10 may become too great, causing loss of resolution in the portions of the document furthest from the lens 2. Therefore, the user may need to angle the camera 1 closer towards vertical. In order to obtain the best image of the document, the user may wish to hold the camera close to vertical, for example within ±30° of vertical. The camera 1 may therefore have a control 19 that allows the user to set the threshold of tilt angle 17 at which the LEDs 20 become operable.

In the case of a tilt angle within 30° of vertical, the projected pattern 24,26 of optical radiation is particularly useful in aligning the camera 1 with the document 10, as the camera 1 in this orientation may need to be held well away from a person's body directed downwards towards the document.

Optionally, the microprocessor 9 may inhibit the operation of the LEDs 20 if the microprocessor determines that the tilt is such that not all of the document 10 is within the focus depth of field.

FIGS. 2 and 3 show alternative embodiments 101,201 of the invention, in which similar features are numbered similarly but incremented by 100 or 200.

The camera 101 of FIG. 2 is a single lens reflex type camera, with a movable mirror 132 set at 45° to the lens optical axis 106. The mirror 132 reflects focused rays 114,116 from the document 110 onto a ground glass screen 134 affixed within the camera body 108. An image of the document 110 may then, in principle, be viewed by a user of the camera 101 through a viewfinder 130.

The camera 101 therefore has four LEDs 120 provided proximate but just outside the bounds of the ground glass screen 134. Each LED is packaged with a lens element 122 that concentrates visible light towards the lens 102 via the mirror 132. Because each LED 120 lies in an image plane of the lens 102, four points 128 of visible light are projected and focused onto the object plane defined by the desktop 112. The camera 101 may then be aimed as described above prior to taking a picture or capturing an image of the document 110.

Because the LEDs 120 are optically isolated from the image capture means 118, these means may be either photographic film or an electronic detector array. When a photograph is taken, the mirror 132 flips up out of the way of rays 114,116 captured by the lens 102. optionally, the LED's may be switched off while the mirror is moved from its rest position.

In an alternative embodiment the mirror 132 may be half-silvered and fixed in place. About half of the light from the LEDs 120 would therefore be projected from the camera lens, and about half the light incident on the mirror from the document 110 would reach the detector 118.

FIG. 3 shows a third embodiment of the camera 201, in which four laser diodes 220 are mounted externally on the body 208 of the camera 201. Each laser diode is in a package with optical elements 222 to produce a highly collimated beam of visible light 224,226 that is projected directly onto the image plane defined by the desktop 212. Each laser diode is angled so that the beams 224,226 diverge with respect to the lens optical axis 206 so that the spots 228 remain just outside the camera field of view.

FIG. 4 illustrates one way in a camera 40 according to the invention may be used. The camera 40 is mounted atop a telescopic pole 42 affixed with a bracket 42 to an edge 44 of a desktop surface 46. A communications cable 45 connects the camera 40 with a suitable controller 47, for example a personal computer. The camera differs from the embodiments described above, in that instead of producing four projected spots defining the edges of the camera field of view, the camera has a visible optical source that projects a pattern in the form of four similar L-shaped areas 48 that bracket the field of view. Such a pattern may result, for example, from an LED or laser diode having an emitting area with the same L-shape, or from a single source split and shaped with a diffractive optical element. A document 50 may therefore be positioned by hand on a desk in the field of view indicated by the four L-shaped areas 48. An advantage of this approach is that the camera 40 may be mounted semi-permanently in a convenient location, for example above a back edge of a desk against a wall. There is therefore no need to store the camera 40 when not in use.

FIG. 5 shows a similar apparatus to that of FIG. 4, in which a camera 60 projects a single cross-shaped pattern 58 in a central area of the document 50, to indicate to a user of the camera 60 the camera field of view, which covers the full document as shown by dashed line 59.

The embodiments described above will generally be used in brightly-lit surroundings. In order to be useful in bright light conditions, each laser diode optical source may need to have an optical output power of at least 1 mW. LEDs are less directional, and may need to be of the order of 100 mW for to provide a similarly bright spot or pattern. Particularly with LED's, it is therefore important to conserve battery power.

Therefore, the light sources may remain off until needed. For example, the camera may have an on/off switch that activates a display showing frame count, exposure or other information. The light sources may remain off, however, until an exposure button is partially depressed, whereupon the light sources come on. The camera may also perform autofocus and auto-exposure functions at the same time.

Although the light sources may need to be switched off during the exposure, the sources may then be switched back on after the exposure has been taken, at least momentarily, in order to help provide confirmation that the camera field of view was correctly oriented.

The camera described above may be used in applications other than desktop document imaging. Referring again to FIG. 1, when the tilt sensor 15 detects that the tilt is less that 30°, the microprocessor 9 changes the mode of operation of the camera from a "document capture" mode to a "scene capture" mode. Camera operating parameters are therefore automatically changed according to the expected use of the camera. For example, documents 10 are expected to be stationary, while other objects may be expected to move. Therefore, the exposure time in document capture mode may be relatively long compared with that for scene capture mode. This allows automatically the use of a smaller aperture in document capture mode, which enhances the depth of field, so allowing the camera 1 to be used further away from a vertical orientation. Alternatively, this allows the use of a less bright flash from a flash unit (not shown), which makes use of camera 1 less obtrusive in an office environment. At other times, the camera 1 can then be used to take conventional photographs, without the user having to remember to inhibit manually the operation of the LEDs 20.

The tilt sensor therefore helps to prevent optical radiation from the LEDs directly entering a person's eyes when the camera is used to image documents, or to capture images of other objects or scenery.

What is claimed is:

1. A camera comprising a detector, a lens arranged to image an object in an object plane onto the detector, a light projector operable to project visible optical radiation onto the object plane to indicate to a user of the camera the field of view imaged onto the detector, and a camera attitude sensor system for sensing the attitude of the camera, wherein the image framing projector is operable in response to the attitude sensor system to project the optical radiation onto the object plane only when the attitude sensor system senses that the camera is oriented so that the optical radiation will be projected downwards.

2. A camera as claimed in claim 1, in which the light projector is an image framing projector operable to project visible optical radiation onto the object plane to indicate to a user of the camera the bounds of the object imaged onto the detector.

3. A camera as claimed in claim 1, in which the light projector is operable in response to the attitude sensor system to project the optical radiation onto the object plane only when the attitude sensor system senses that the camera is oriented so that the optical radiation will be projected downwards with a predetermined angle at least 30° below horizontal.

4. A camera as claimed in claim 3, in which the light projector is operable to project the optical radiation onto the object plane only when the attitude sensor system senses that the camera is oriented so that the optical radiation is projected downwards within 30° of vertical.

5. A camera as claimed in claim 1, in which the attitude sensor system senses the rate of change of the attitude of the camera, the light projector being operable in response to the attitude sensor system to project the optical radiation onto the object plane only when the attitude sensor system senses that the rate of change of camera attitude is below a predetermined threshold.

6. A camera as claimed in claim 1, comprising a timer that times a predetermined time delay in response to the camera attitude sensor when the camera has been orientated so that the optical radiation would be projected downwards, the optical radiation automatically being projected downwards following the predetermined time delay.

7. A camera as claimed in claim 1, in which the camera includes a manually operable control which when activated by a user of the camera causes the optical radiation to be projected when the attitude sensor system senses that the camera is oriented so that the optical radiation will be projected downwards.

8. A camera as claimed in claim 1, in which the camera has at least two modes of operation, one of the modes of operation being a document-capture mode, the camera being automatically configured in the document-capture mode when the attitude sensor system senses that the camera is oriented so that the optical radiation will be projected downwards.

9. A camera as claimed in claim 1, in which the source of optical radiation is projected onto the object plane independently of the lens.

10. A camera as claimed in claim 1, in which the lens projects the optical radiation onto the object plane.

11. A camera as claimed in claim 10, in which the camera has a viewfinder and a mirror that reflects light between the lens and viewfinder, wherein the optical radiation is directed to the lens via a reflection from the mirror.

12. A camera as claimed in claim 11, in which the camera is a single lens reflex camera with a movable mirror.

13. A camera as claimed in claim 11, in which the mirror is fixed and partially reflective and transmissive.

14. A camera as claimed in claim 10, in which the source of optical radiation is in an image plane of the lens.

15. A camera as claimed in any preceding claim, in which the image capture means includes a detector array.

* * * * *